No. 651,105. Patented June 5, 1900.
R. R. CROSS.
AXLE BOX.
(Application filed Nov. 16, 1898.)
(No Model.)
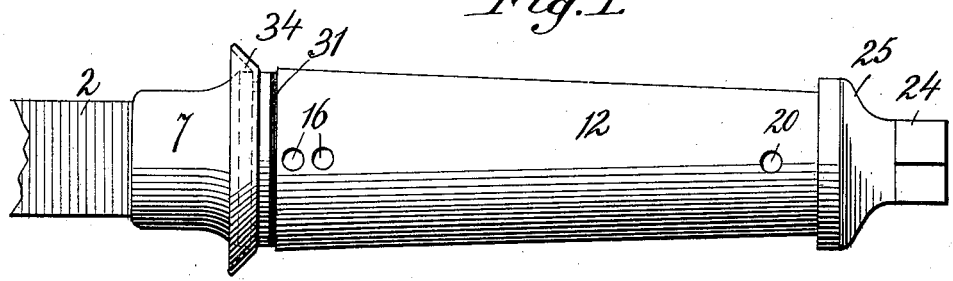
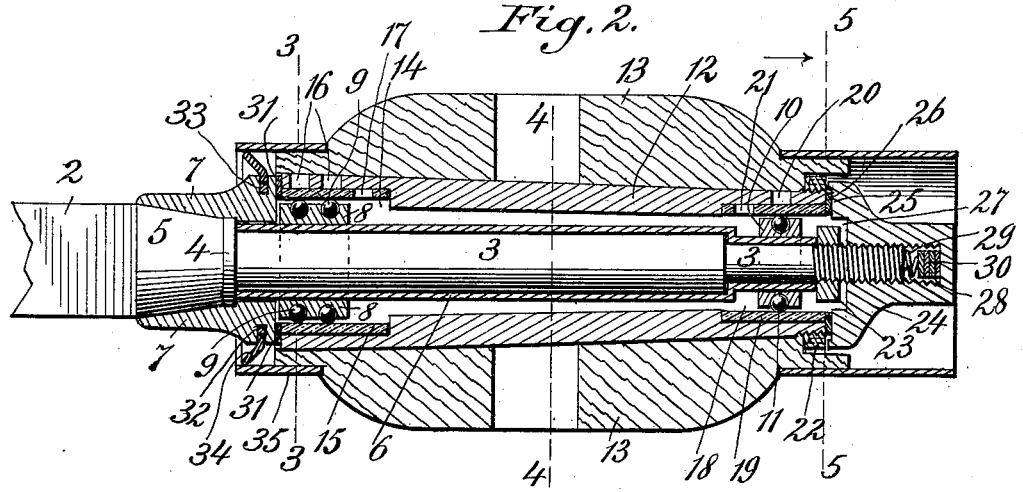
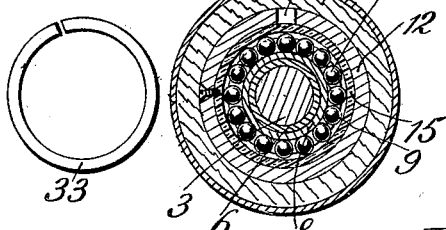
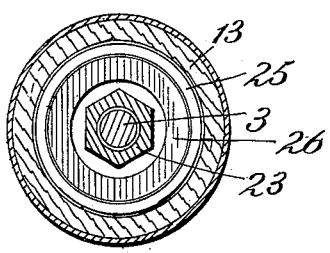
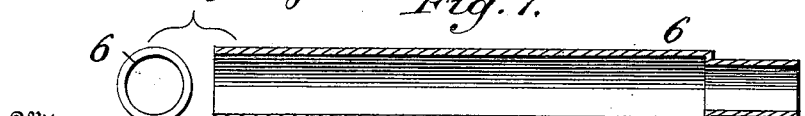
Witnesses
F. H. Schott
Anton A. Gleitzner
Inventor
Ransler R. Cross
Grant Burroughs
Attorney
THE NORRIS PETERS CO., PHOTO-LITHO., WASHINGTON, D. C.

UNITED STATES PATENT OFFICE.

RANSLAR R. CROSS, OF ONEONTA, NEW YORK.

AXLE-BOX.

SPECIFICATION forming part of Letters Patent No. 651,105, dated June 5, 1900.

Application filed November 16, 1898. Serial No. 696,621. (No model.)

*To all whom it may concern:*

Be it known that I, RANSLAR R. CROSS, a citizen of the United States, residing at Oneonta, in the county of Otsego and State of New York, have invented certain new and useful Improvements in Axle-Boxes, of which the following is a full, clear, and exact description, such as will enable those skilled in the art to which it appertains to make and use the same, reference being had to the accompanying drawings, forming a part of this specification.

This invention relates to improvements in axle-boxes of that description which are used in vehicles of that class ordinarily termed "carriages" and "wagons."

It consists of the novel construction, combination, and arrangement of parts, such as will be hereinafter fully described, pointed out in the appended claims, and illustrated in the accompanying drawings.

In the accompanying drawings, Figure 1 is a plan view of an axle-box embodying the invention. Fig. 2 is a longitudinal sectional view of the same. Fig. 3 is a transverse vertical sectional view on the line 3 3 of Fig. 2. Fig. 4 is a similar view on the line 4 4 of the same figure. Fig. 5 is a similar view on the line 5 5 of the same figure. Fig. 6 is a detail view showing the curtain-carrying bearing. Fig. 7 is a detail view showing a longitudinal section of the sleeve mounted on the spindle.

In the accompanying drawings similar reference characters designate corresponding parts.

The main part of the axle 2 may be of any construction suitable in the premises. Projecting from the end of the axle is the spindle 3. When an axle is accidentally broken, the fracture generally occurs near the jointure between the main part of the axle and the spindle. A mechanism is provided for strengthening this part of the axle. Adjacent to the spindle the axle has an annular shoulder 4 and a conically-shaped portion 5. On the spindle 3 and abutting the shoulder 4 is a sleeve 6. A band 7, with a suitably-shaped interior, fits over the conically-shaped portion 5 and the shoulder 4 of the axle and also over the end of the sleeve 6. By means of this construction the axle is strengthened at and on both sides of the jointure between the main part of the axle and the spindle.

To lessen the friction between the bearing parts, a ball-bearing mechanism is provided. On the inner end of the sleeve 6, adjacent to the band 7, is a collar 8, carrying two sets of balls 9. On the outer end of the sleeve 6 is a collar 10, carrying one set of balls 11. The portion of the sleeve on which the collar 10 is placed has a reduced cross-section as compared with the main part of the sleeve. The outer end of the spindle is shaped to fit the sleeve. The collar 10 is smaller than the collar 8.

A casing 12, on which hub 13 is mounted, tapers from its inner to its outer end. In its inner end an annular recess 14 is formed in its inner face. In this recess is the bushing 15, that bears on the balls 9, carried by the collar 8. In the wall of the casing are apertures 16, which respectively register with the grooves in the collar 8, which carries the balls 9. In the bushing 15 is an aperture 17. In the outer end of the casing an annular recess 18 is formed in its inner face. In this recess is the bushing 19, that bears on the ball 11, carried by the collar 10. In the wall of the casing an aperture 20 is formed to register with the groove in the collar 10, in which the balls 11 are carried. An aperture 21 is formed in the inner end of the bushing 19.

In assembling the several parts comprising the ball-bearing mechanism the collars are first placed in position on the sleeve 6 and are secured thereon in any suitable manner. Then the casing 12 is placed over the collars, with its apertures 16 and 20, respectively, registering with the grooves in the collars 8 and 10. The bushing 15 is then shoved between the casing and the collar 8 and adjusted so that the aperture 17 in the same registers with the first of the openings 16 of the casing registering with the first of the grooves in the said collar. The balls for the first groove are then inserted through the apertures 16 and 17 into the said groove. The bushing is then moved until its aperture 17 registers with the second of the openings 16 of the casing registering with the second groove in the collar 8. The balls for the second groove are then inserted through the registering openings 17 and 16 into the said second groove. The bushing is then adjusted so that its outer edge is flush with the outer edge of the casing 12. In this latter position the bushing will hold the balls in their respective grooves against accidental displacement. The balls in the single collar 10 are placed in position by a similar manipulation of the bushing 19. The casing 12 is then placed in the hub 13 from the inner side of the latter. Owing to the tapering formation of the casing and the aperture in the hub the distance to which the casing can be inserted is limited. Movement of the casing in the opposite direction is prevented by the ring 22, screwed on the outer end of the casing. The band 7 having first been placed in position on the axle, the spindle is inserted in the sleeve 6, and the latter is adjusted so that the inner end abuts the shoulder 4 and is between the said band and the spindle.

Mechanism for securing the hub and its adjuncts on the spindle is provided. The outer end of the spindle is screw-threaded. A nut 23 is turned on the screw-threaded end of the spindle and holds the sleeve in place. A nut 24 is also turned on the screw-threaded portion of the spindle and has an annular flange 25, that bears against the outer end of the casing 12 and serves to hold the latter in place upon the sleeve and the ball-bearings. Interposed between the nut 24 and the casing is a washer 26 to take up the wear between these parts. In the inner face of the nut 24 is a chamber 27 to receive the nut 23 to allow the adjustment of the latter on the spindle. In the top of the nut 24 is a recess 28, in which are a spring 29 and the disks 30. The spring serves to lock the nut 24 in place. As the bearing-surfaces of the casing and the parts against which these surfaces turn become worn the play can be taken up by turning the nut farther onto the spindle. When the nut 24 is turned onto the spindle so far as to compress the spring 29 too much, one of the disks 30 can be removed to give more room. Interposed between the inner end of the casing and the band 7 is another washer 31, that also serves to take up the wear.

A device is provided for excluding dust and dirt from the inner end of the axle-box. In the band 7 an annular groove 32 is formed, in which is journaled an annular bearing 33, adapted to rotate in the said groove. A curtain 34, of elastic material, is stretched over the annular bearing 33 and is adapted to rotate therewith. The outer periphery of the curtain bears against the inner face of the sand-band 35, mounted on the hub 13. The sand-band compresses the curtain, and as it rotates with the hub it carries the curtain with it. As dust or dirt to obtain access to the axle-box would have to pass between the parts in the groove 32 or between the edge of the curtain and the sand-band, it is practically excluded.

While the hereinbefore-described embodiment of the invention is the preferred one, yet it can be departed from to a considerable extent without departing from the spirit of the invention.

Having thus described my invention, what I claim, and desire to secure by Letters Patent, is—

1. A spindle, a sleeve removably mounted on said spindle, a casing, ball-bearings interposed between said sleeve and said casing, a nut turned on said spindle to hold said sleeve in place, a second nut having a recess in its head turned on said spindle for holding said casing in place, and a spring carried in said recess and bearing on the end of said spindle.

2. A spindle, a sleeve removably mounted on said spindle, a casing, ball-bearings interposed between said sleeve and said casing, a nut turned on said spindle to hold said sleeve in place, a second nut turned on said spindle to hold said casing in place and having a chamber in its face to receive the first-mentioned nut and provided with a recess in its head, a spring carried in said recess and bearing on the end of said spindle, and removable disks placed in said recess back of said spring.

3. An axle, a spindle projecting from said axle, a sleeve removably mounted on said spindle, a band placed on said axle and extending over said sleeve, a casing, ball-bearings interposed between said sleeve and said casing, a nut turned on said spindle to hold said sleeve in place, and a second nut turned on said spindle to hold said casing in place.

4. An axle, a spindle projecting from said axle, a sleeve removably mounted on said spindle, a band placed on said axle and projecting over said sleeve, a casing, ball-bearings interposed between said sleeve and said casing, a nut turned on said spindle to hold said sleeve in place, a second nut turned on said spindle for holding said casing in place and having a chamber in its face to receive the first-mentioned nut and provided with a recess in its head, and a spring carried in said recess and bearing on the end of said spindle.

5. A spindle, a sleeve placed on said spindle, a casing, ball-bearings interposed between said sleeve and said casing, a nut turned on said spindle to hold said sleeve in place, and a second nut turned on said spindle for holding said casing in place and having a chamber in its inner face to receive the first-mentioned nut.

6. A spindle, a sleeve removably mounted on said spindle, a collar provided with an annular groove placed on said sleeve, a casing, balls carried in said groove and bearing against said casing, a nut turned on said spindle for holding said sleeve in place, and a second nut turned on said spindle for holding said casing in place.

7. A spindle, a sleeve removably mounted on said spindle, a collar provided with an annular groove placed on said sleeve, a casing, balls carried in said groove and bearing against said casing, a nut turned on said spindle for holding said sleeve in place, a second nut turned on said spindle for holding said casing in place and having an annular chamber in its face to receive the first-mentioned nut and provided with a recess in its head, and a spring carried in said recess and bearing on the end of said spindle.

8. A spindle, a sleeve removably mounted on said spindle, a collar provided with an annular groove placed on said sleeve, a casing provided with an aperture registering with said groove, a bushing adjustably mounted in said casing and provided with an aperture adapted to register with said groove and the aperture in said casing, balls carried in said groove and bearing against said bushing, a nut turned on said spindle for holding said sleeve in place, and a second nut turned on said spindle for holding said casing in place.

9. A spindle, a sleeve removably mounted on said spindle, a collar provided with an annular groove placed on said sleeve, a casing provided with an aperture registering with said groove, a bushing adjustably mounted in said casing and provided with an aperture adapted to register with said groove and the aperture in said casing, balls carried in said groove and bearing against said bushing, a nut turned on said spindle for holding said sleeve in place, and a second nut turned on said spindle for holding said casing in place and having a chamber in its face to receive the first-mentioned nut and provided with a recess in its head, and a spring carried in said recess and bearing on the end of said spindle.

In testimony whereof I hereunto affix my signature in the presence of two witnesses.

RANSLAR R. CROSS.

Witnesses:
GRANT BURROUGHS,
HUGH M. STERLING.